Feb. 21, 1933. O. DOMRIES ET AL 1,898,870
DISK FURROWING AND BLOCKING MACHINE
Filed Feb. 5, 1930 3 Sheets-Sheet 1
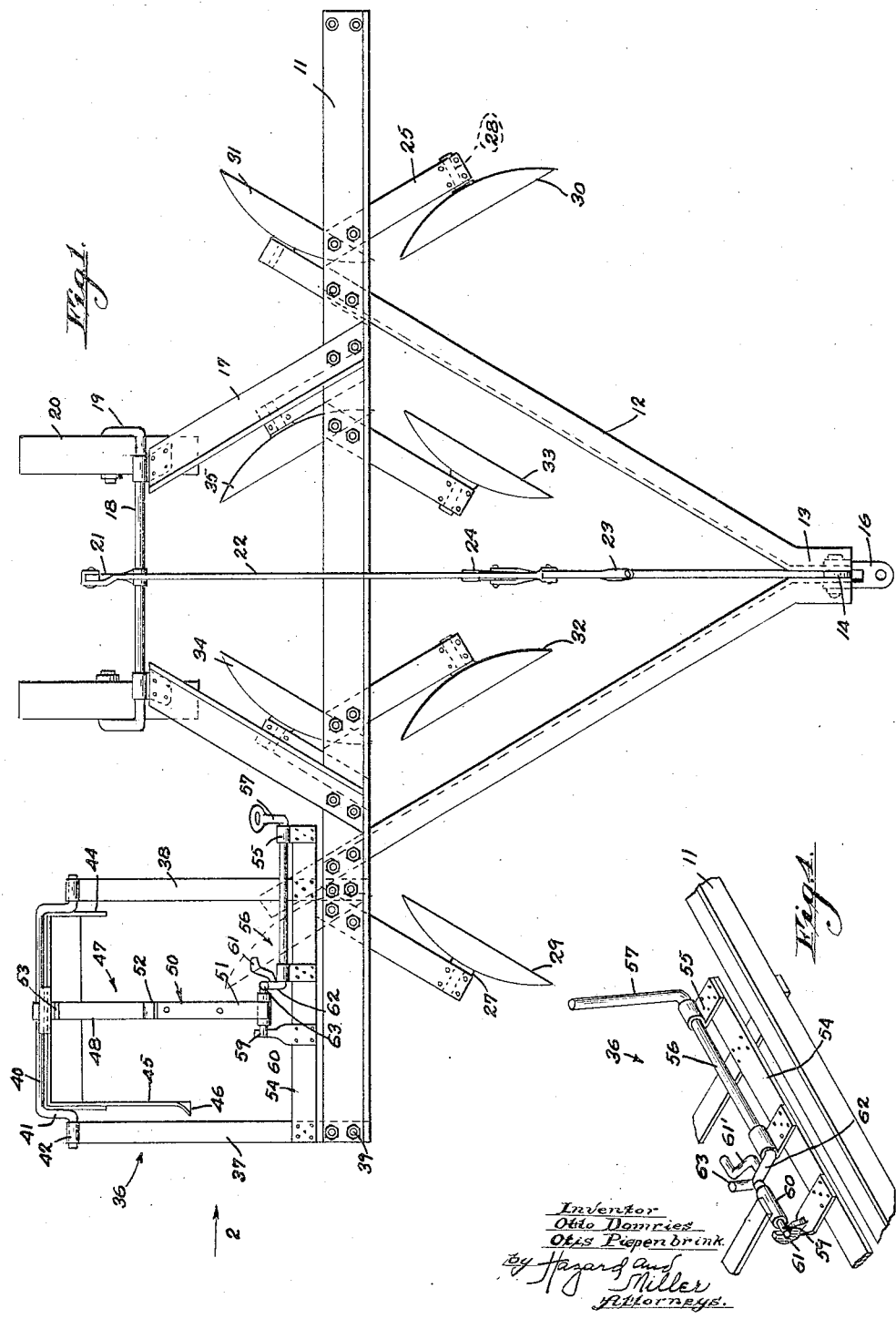

Feb. 21, 1933.  O. DOMRIES ET AL  1,898,870
DISK FURROWING AND BLOCKING MACHINE
Filed Feb. 5, 1930  3 Sheets-Sheet 2
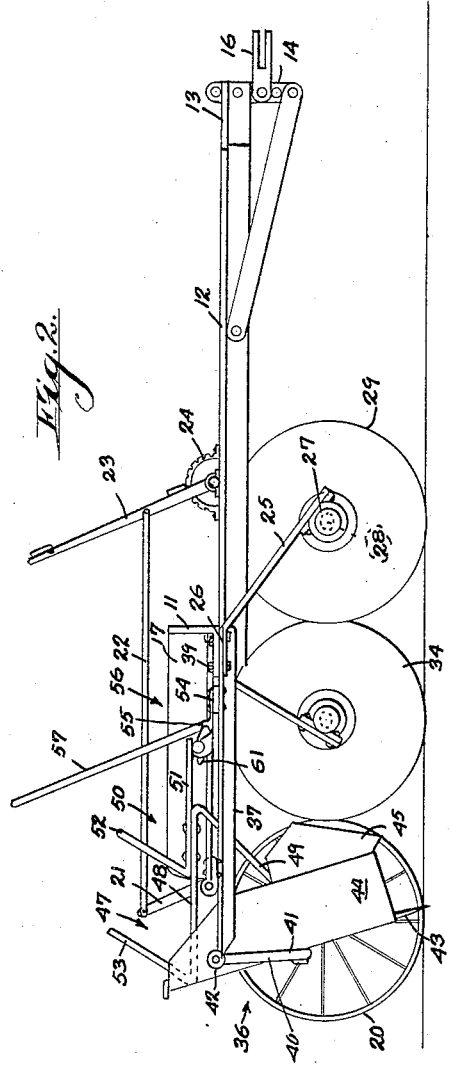
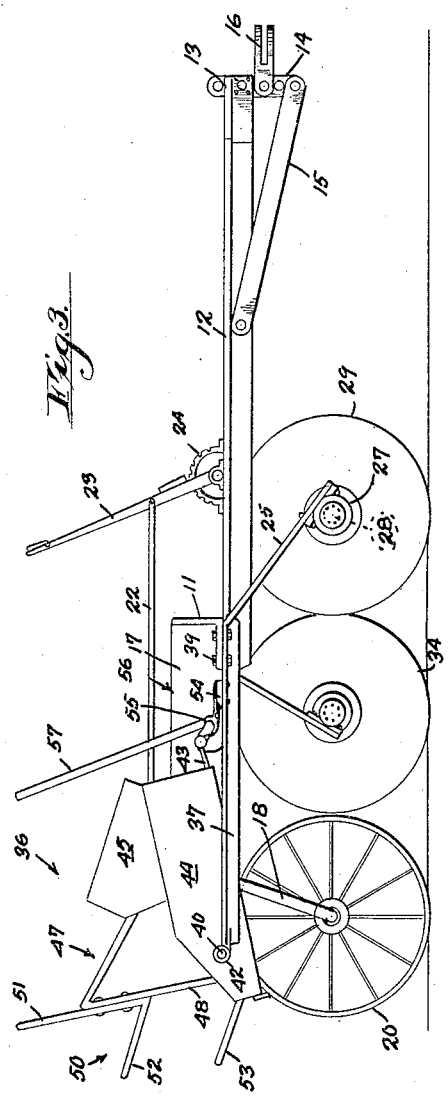
Inventor
Otto Domries
Otis Piepenbrink
by Hazard and Miller
Attorneys

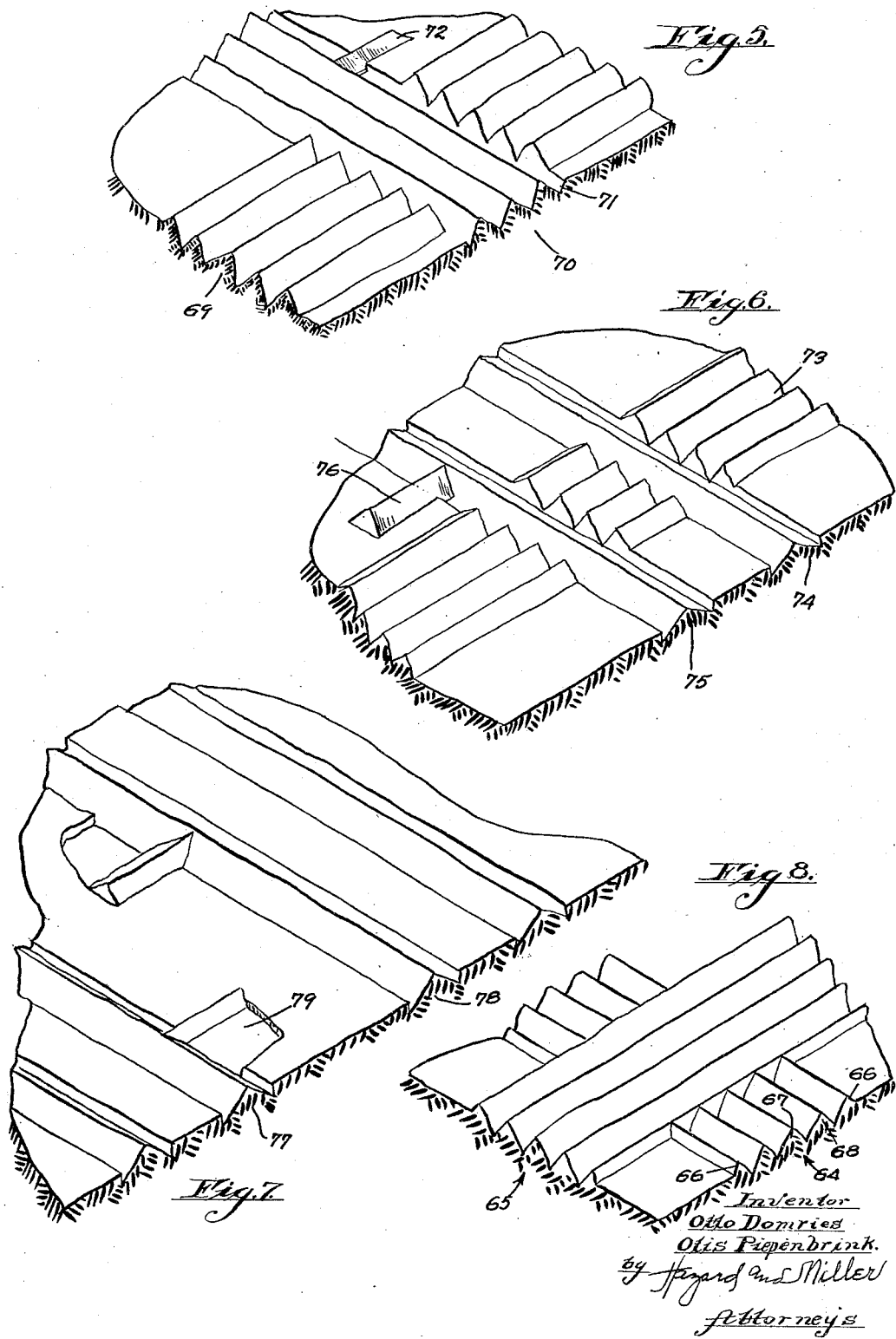

Patented Feb. 21, 1933

1,898,870

UNITED STATES PATENT OFFICE.

OTTO DOMRIES, OF SANTA ANA, AND OTIS PIEPENBRINK, OF GARDEN GROVE, CALIFORNIA; SAID PIEPENBRINK ASSIGNOR TO SAID DOMRIES

DISK FURROWING AND BLOCKING MACHINE

Application filed February 5, 1930. Serial No. 426,058.

Our invention pertains to a disk furrowing and blocking machine of a type particularly utilized in irrigation work, such as irrigating orchards, and open fields.

An object of our invention is a furrowing machine of a disk type which may have a removable blocking attachment thereon, the disk furrowing features of the machine being adapted to form a plurality of parallel furrows through which water may be run in irrigating and by eliminating certain of the disks, the type of furrows may be altered. For instance, with all the disks, furrows may be made having a plurality of what might be termed center ridges, in which the bottoms of the furrows are cut below the level of the ground and marginal ridges in which the outer portion of such ridges is from the ground level.

With another type of furrowing having some of the disks removed, there are a plurality of intermediate furrows and marginal furrows having a vertical cut from the ground level downwardly below such level. With our machine a variety of various formations of furrows for irrigation purposes may be formed and these may be blocked by the blocking attachment to form openings for the flow of irrigating water through the various marginal ridges and thereby to irrigate spaces around trees which may be surrounded by a ridge.

Our invention is illustrated in connection with the accompanying drawings, in which, Fig. 1 is a plan showing a complete set of disks and the blocking attachment mounted on the machine;

Fig. 2 is a side elevation taken in the direction of the arrow 2 of Fig. 1, with the blocker in the operative position;

Fig. 3 is a view similar to Fig. 2 with the blocker in the inoperative position;

Fig. 4 is a detail perspective view showing the control of the blocker.

Figs. 5, 6, 7 and 8 are perspective views of different types of furrowing and blocking, showing some in longitudinal parallel furrows and arrangements of cross furrowing, the different arrangements being by eliminating more or less of the rear or trailing disks.

In constructing our machine, we utilize a substantial transverse beam 11, preferably in the shape of an angle, to which is connected a pair of draw beams 12. These draw beams converge and are secured together at the forward end 13, from which end there is a depending post 14 and lateral braces 15 to each of the beams 12. A clevis 16 is attached to the post 14 and may be utilized for attachment to a tractor or other pulling device. Extending rearwardly from the beam 11 there are a pair of lateral frame beams 17; each of these being mounted on a crank-shaped axle 18. This axle has crank portions 19 on which the wheels 20 are rotatable. A lever 21 is connected to approximately the center of the crank axle and from this there is a forwardly extending link 22, such link being attached to a hand operating lever 23. This lever works over a toothed segment 24 having an engaging pawl by which the crank axle may be shifted and the elevation of the frame of the machine above the ground may be thus regulated.

The various disks are attached to the beam 11 by means of a shank 25, this shank having an end 26 bolted to the beam 11 and having journals 27 for mounting the stub axles 28 of the disks. In the illustration of Fig. 1 there are two forward marginal disks 29 and 30 which extend forwardly from the beam 11 and are so inclined as to turn the soil inwardly towards the axial center of the machine. Extending rearwardly from the beam 11 there is illustrated a single trailing marginal disk 31. It is to be understood that in some cases the blocking attachment may be removed in the manner to be hereinunder detailed and a similar disk to 31 employed on the opposite side of the machine as indicated dotted in Fig. 1, or the disk 31 may be removed and the blocker shifted to the opposite side of the machine. In addition to these disks there are a pair of forwardly extending disks 32 and 33 which are attached to the beam 11 by forwardly extending shanks and are located inside of the draw beams 12. These are positioned to turn the soil from the axial center of the machine outwardly and cooperating with the disks 29 and 30 form a ridge with a deep furrow on opposite sides of the ridge.

Located behind the beam 11 in a trailing position are two disks 34 and 35. These are each attached to a shank and are positioned to turn the soil inwardly. They are positioned to operate in the same furrow made by the disks 32 and 33 and to turn the soil into the axial center of the machine, forming a center ridge. These disks 34 and 35 are illustrated located inside of the frame beams 17.

The blocker designated generally by the numeral 36 has a pair of side beams 37 and 38 which are secured by bolts 39 to the beam 11. This beam is provided at both ends with suitable holes for the bolts so that the blocker may be transferred from one end to the other end of the machine. This blocker has a crank-shaped shaft 40 mounted with the crank portions 41 in journals 42 at the rear end of the side members 37 and 38 and secured to this crank shaft there is a cutting and digging blade 43. This blade has side pieces 44 to prevent the soil from being forced out laterally and at the outer side also has a flanging plate 45, this having an outward flare 46. Secured to the front face of the scraper blade 43, there is an angular bracket 47 formed of metal strap material, this having an upper portion 48 secured to the blade 43 on one side of the shaft 40 and having a lower portion 49 secured below this shaft. An angle strap 50 is secured to the portion 48 of this bracket and has a projecting end 51 at substantially right angles to the blade 43 and an outstanding finger 52. The bracket 47 is also preferably bent to have an outstanding finger 53.

Secured to the side elements 37 and 38 there is a transverse plate 54 having journals 55 thereon for a tripping shaft 56. This shaft has an upwardly extending end 57 to which a cable or the like is to be attached so that the operator of the tractor may control this shaft 56. The outer end of the shaft has an offset portion 59 with a roller 60 mounted thereon and the outer end 59 is adapted to engage a bracket 61 secured to the bar 54. There is also an offset engaging finger 61' attached to the crank portion 62 of the shaft 56 and a second offset portion 63.

As illustrated in Figs. 1, 2 and 4, the tripping shaft 56 is in position so that the strap end 51 secured to the bracket 47 and thereby rigidly attached to the scraper blade, is positioned bearing on the roller 60 and holding the scraper blade 43 in position for cutting into the soil, or as this is used for blocking ridges, it digs into the ridge cut by the disks. When the operator pulls on the cable attached to the end 57 of the tripping shaft, it disengages this end 51 from the roller 60 and allows the scraper blade to rotate due to its engagement with the soil. After the blade has cleared the soil the rotation is continued by the ends 51, 52 and 53 of the bracket 47 engaging the soil and rotating the scraper blade until it is brought past the center of rotation and then due to its counterbalancing action it tips forward and if the tripper shaft 56 has been released, the end of the scraper blade is caught by the projecting finger 61' and held in the inoperative position shown in Fig. 3. To bring the scraper blade into the operative position, it is merely necessary for the operator to trip the shaft 56 and allow it to return so that the scraper blade will drop and the end 51 brought into engagement with the roller 60.

It is to be understood that the blocker as a whole may be located on either end of the beam 11 and that in so doing the flanging plate 45 may be unbolted from one of the side plates 44 and shifted to the opposite side plate. In this shifting it is necessary to remove the disk 31 from the side having the blocker.

In Figs. 5, 6, 7 and 8 I illustrate different types of cross and direct furrows. For instance, in Fig. 8 the rows of furrows and ridges designated as 64 are made with all of the disks on the machine and the cross furrows 65 are made with all of the disks, these cross furrows 65 cross and cut the furrows and ridges 64. In this case the outer ridges 66 are made by the soil turned out by the trailing disks 31 on the outer portions of the beam. The center ridge 67 is made by the center trailing disks 34 and 35 and the intermediate ridges 68 are made by the leading disks 29 and 32 and 33 and 30. In this case using all the disks, the blocking attachment is removed from the machine. In the drawings of Fig. 5 there is illustrated a row of ridges and furrows 69 formed with all of the disks on the machine and a longitudinal row 70 with the outer disks 31 removed, in which case there are marginal furrows 71 on opposite sides cut by the outer front disks 29 and 30 and in this case the blocking machine is indicated as blocking part of the soil indicated at 72, cutting into the edge of the soil at the side furrow on one side, partly filling this furrow and extending a block on to the level ground and this block therefore diverts the water flowing in the marginal furrow and causes it to spread over the adjoining level ground.

In Fig. 6 the row of furrows 73 is illustrated as being made with the machine having all the disks thereon and the blocker removed and the furrows 74 made by utilizing the leading disks only, the trailing disks being removed. In this case the ridges 75 are made by the leading disks 29 and 32 and 33 and 30. In this case the blocker may be utilized forming the block indicated at 76. In Fig. 7 we illustrate a series of longitudinal furrows and ridges 77 and 78 formed by two parallel runs of the machine. In this case the soil is blocked as indicated at 79, thus forming cuts for diverting the water running down the marginal furrows.

It will be seen by these illustrations that we can employ either all of the trailing disks or remove the outside pair or the center pair and secure different types of furrows and ridges and the blocking machine may be utilized to block the furrows which may have a too deep slope, or in which it is desired to divert the water flowing in a furrow and this may be done without any hand shoveling whatever being necessary to block the furrows.

It will be noted that the blocking attachment is positioned so that it engages the surface of the soil partly outside of the furrows cut by the outside leading disks, turning this soil partly across the outside furrow and partly across the surface of the ground, thereby effectively diverting water flowing down the said furrow.

Various changes may be made in the principles of our invention without departing from the spirit thereof as set forth in the description, drawings and claims.

We claim:

1. A disk furrowing machine having a frame with the forward end adapted for attachment to a tractor, wheels connected to the rear end with means operable to regulate the elevation of the frame in regard to the ground level, a transverse beam connected to the frame, a leading set of disks, each mounted on a strap attached to the said beam and extending forwardly at an inclination thereto, there being an inner pair of disks positioned to cut two furrows and to turn the soil outwardly, and a pair of outer disks positioned to cut two furrows and to turn the soil inwardly forming four furrows and two ridges, a trailing set of disks each mounted on a strap extending at an inclination rearwardly from the beam, there being an inner pair of disks positioned to operate in the furrow formed by the inner pair of leading disks and turn the soil inwardly to form a center ridge and a pair of outer disks operating in the furrow formed by the outer disks of the leading set and positioned to turn the soil outwardly forming a ridge, any one or more of the trailing set of disks being adapted for detachment from the said beam.

2. A disk furrowing machine having a frame with a cross beam connected thereto, a leading set of disks, each disk having a shank member connected between the disk and the beam and extending forwardly thereof at an inclination to the beam, and a trailing set of disks, each disk having a shank-like member extending rearwardly from the beam and at an inclination thereto, any one or more of the disks of the trailing sets with the attaching shank or shanks being removable.

3. A disk furrowing machine having a frame with a forward end adapted for attachment to a tractor, a supporting means, a transverse beam on the frame, the beam having a first set of shanks extending forwardly therefrom at a lateral inclination to the beam, each shank having a leading disk journaled thereon, and a second set of shanks extending rearwardly from the beam and inclined thereto laterally, each of the shanks of the second set having a trailing disk mounted thereon, said disks being placed whereby a leading and a trailing disk form a furrow.

4. A disk furrowing machine having a frame with a forward end having means for attachment to a tractor, wheels connected to the rear end and a transverse beam secured to the frame, a set of shank members attached to the beam and extending forwardly at an inclination laterally to the beam, and a second set of shank members attached to the beam and extending rearwardly and at an inclination transversely to such beam, each shank having a stub axle with a disk journaled thereon, thereby forming a leading and a trailing set of disks, said shanks and disks being positioned whereby a leading and a trailing disk form a furrow.

5. A disk furrowing machine having a frame with means at the forward end for attachment to a tractor, wheels at the rearward end, a transverse beam, and a plurality of shank members, some extending forwardly and others rearwardly from the beam, said shank members being at an inclination to the beam considered laterally and inclined downwardly therefrom, each shank having a stub axle with a disk journaled thereon, thereby forming a leading set of disks in front of the beam and a trailing set behind the beam, said disks being arranged whereby a leading disk and a trailing disk form a furrow.

6. A disk furrowing machine having a frame with means at the forward end for attachment to a tractor, wheels at the rearward end, a transverse beam, and a plurality of metal shank members bolted to the beam whereby certain ones extend forwardly and others extend rearwardly therefrom, adjacent forwardly and rearwardly extending members being inclined laterally in the same direction and inclined downwardly toward the front and rear, each shank having a stub axle with a disk mounted thereon, thereby forming a leading and a trailing set of disks, the disks of each set being arranged in pairs and positioned whereby a leading and a trailing disk form a furrow.

In testimony whereof we have signed our names to this specification.

OTTO DOMRIES.
OTIS PIEPENBRINK.